United States Patent
Steinbrecher (10) Patent No.: US 8,401,134 B1
(45) Date of Patent: Mar. 19, 2013

(54) BROADBAND HIGH DYNAMIC RANGE DIGITAL RECEIVING SYSTEM FOR ELECTROMAGNETIC SIGNALS

(75) Inventor: Donald H. Steinbrecher, Brookline, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 356 days.

(21) Appl. No.: 12/832,416

(22) Filed: Jul. 8, 2010

Related U.S. Application Data (60) Provisional application No. 61/277,938, filed on Sep. 30, 2009.

(51) Int. Cl.
*H04B 7/10* (2006.01)

(52) U.S. Cl. .................................. 375/347; 375/349

(58) Field of Classification Search .................. 375/144, 375/346–349, 148, 340
See application file for complete search history.

(56) References Cited

U.S. PATENT DOCUMENTS

| | | | | |
|---|---|---|---|---|
| 6,115,409 A * | 9/2000 | Upadhyay et al. | ............ | 375/144 |
| 6,125,080 A * | 9/2000 | Sonnenschein et al. | ...... | 367/134 |
| 6,263,094 B1 * | 7/2001 | Rosich et al. | ................. | 382/128 |
| 6,289,062 B1 * | 9/2001 | Wang et al. | .................... | 375/346 |
| 6,498,804 B1 * | 12/2002 | Ide et al. | ......................... | 375/144 |
| 6,577,686 B1 * | 6/2003 | Koga et al. | ..................... | 375/347 |
| 7,660,567 B1 * | 2/2010 | Gehring et al. | ............ | 455/226.2 |
| 7,746,967 B2 * | 6/2010 | Ho et al. | ........................ | 375/347 |
| 2002/0181627 A1 * | 12/2002 | Wengler | ........................ | 375/347 |
| 2004/0234012 A1 * | 11/2004 | Rooyen | .......................... | 375/347 |
| 2008/0232438 A1 * | 9/2008 | Dai et al. | ...................... | 375/148 |
| 2010/0020907 A1 * | 1/2010 | Rezvani et al. | ............... | 375/347 |
| 2012/0269254 A1 * | 10/2012 | Erden | ........................... | 375/232 |

* cited by examiner

Primary Examiner — Emmanuel Bayard
(74) Attorney, Agent, or Firm — James M. Kasischke; Michael P. Stanley; Jean-Paul A. Nasser

(57) ABSTRACT

A method is provided for the design of a wide-band high dynamic-range electromagnetic signal receiving system. The method provides for receiving a plurality of analog signals, converting the plurality to a digital replica that can be processed to recover separate high-fidelity replicas of each individual signal in the received plurality. The method also provides increasing the signal dynamic range with a parallel architecture comprising "p" identical parallel analog-to-digital channels wherein the value of is determined by the ratio of the largest amplitude signal to the minimum detectable signal. Further, it is demonstrated that "p" is the fundamental limit on the number of parallel channels necessary to linearly process a specified plurality of signals containing a largest signal and a minimum detectable signal.

4 Claims, 5 Drawing Sheets

BROADBAND HIGH DYNAMIC RANGE DIGITAL RECEIVING SYSTEM FOR ELECTROMAGNETIC SIGNALS

This application claims the benefit of U.S. Provisional Patent Application No. 61/277,938 filed on Sep. 30, 2009 and entitled "A Broadband High Dynamic Range Digital Receiving System for Electromagnetic Signals" by the inventor, Donald H. Steinbrecher.

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention relates to a digital receiving system for electromagnetic signals.

(2) Description of the Prior Art

In the field of signal acquisition systems, there is a need for jam-resistant wideband multifunction digital systems. To address this need, U.S. Pat. Nos. 6,466,167 and 7,250,920 disclose segmenting an air interface as part of a communications system.

In Steinbrecher (U.S. Pat. No. 6,466,167), an antenna apparatus is disclosed in which the apparatus comprises an array of antenna elements with each element having a phase center. An observable signal is generated in which the signal contains a low frequency component and a high frequency component is generated. The high frequency component is summed with the signal received by each antenna element being near a phase center.

As described in the reference, these signals are fed into a signal processing arrangement that processes the signals with the low frequency component of the observable signal, including analog-to-digital conversion, in order to: (i) remove the high frequency component of the observable signal; (ii) normalize the effects of the signal transfer characteristics on the digital sum signals; (iii) synchronously re-sample the digital sum signals; and (iv) differentially time reference each digital sum signal to the phase center of the corresponding antenna element. The processed digital signals are combined into a single composite signal.

The Steinbrecher patent also teaches a method for conditioning and recombining a plurality of digital channels without the loss of dynamic range or system sensitivity. The linear dynamic range of digital signal processors designed to combine multiple digital data streams is related to the way that numerical values are represented in the digital signal processor. Floating point processors represent numerical values by two digital values that represent integers: 1) a power of ten known as the 'characteristic' or 'exponent' and 2) a number between 0 and 10 that is known as the 'mantissa' or 'significand'. Digital signal processor linear dynamic range is related to the number of bits reserved for representing the mantissas.

Generally, the signal dynamic range of the digital signal processor is at least 5 dB for each mantissa bit, which implies that a 24 bit mantissa representation would lead to an approximately 120 dB signal dynamic range. Since the number of bits assigned to each mantissa is a programmable value, a digital signal processor can be programmed to have an adequate signal dynamic range to linearly combine a plurality of analog-to-digital converter (ADC) data streams. Each time that the number of ADCs is doubled, the digital signal processor dynamic range requirement increases by 6 dB or one bit. Thus, it is prudent to add at least two bits to each mantissa representation for each time that the number of ADCs is doubled.

The Steinbrecher reference further teaches that when the digital data streams produced by $(2)\exp(Y)$ ADCs are linearly combined, the Third Order Intercept (TOI) of the system increases by $(3 \times Y)$dB. Since the noise figure of the system is nearly unaffected by the multiple conversion process, the spurious-free dynamic range (which is proportional to the $2/3$ power of the TOI) increases by $(2 \times Y)$dB. The resulting increase in TOI is demonstrated in the example of two narrowly spaced equal-amplitude frequency tones that are commonly called a 'two-tone'.

Assume that a two-tone signal is applied through a M-way power divider to a parallel array of M ADCs such that the two-tone peak voltage is approximately equal to the full scale ADC voltage in each ADC and further assume that the resulting input third-order intercept is TOI(M). Next, assume that two such M-arrays are combined with a two-way power divider.

In order to achieve the same signal level in each of the 2M ADCs, the input two-tone power level must be increased by 3 dB. Assuming that the third-order inter-modulation terms remain coherent, the input-referred inter-modulation ratio will remain the same in the 2M-array—as was observed in the M-array. It follows that the TOI(2M), which is the input level expressed in dB plus one-half of the inter-modulation ratio expressed in dB, will be 3 dB greater than TOI(M)[expressed as an equation TOI(2M)=2×TOI(M)].

Since the noise is uncorrelated across the 2M ADC channels, the noise figure will remain the same for the 2M array as for the M-array—except for a small increase that will result from the loss of the two-way power divider. It also follows that the spurious-free dynamic range, which is proportional to the $2/3$ power of the TOI, will increase by 2 dB.

In Steinbrecher (U.S. Pat. No. 7,250,920), an air interface metasurface is described that efficiently captures incident broadband electromagnetic energy and provides a method for segmenting the total metasurface capture area into a plurality of smaller capture areas such that the sum of the capture areas is equal to the total capture area of the metasurface. The segmentation of the electromagnetic capture area is analogous to the segmentation of the focal plane of a digital camera into pixels. Thus, the equal area segments of the air interface are called "epixels".

The segmentation property of the Steinbrecher metasurface is used to improve the performance of a digital receiving system that is designed to capture small electromagnetic signals in a wideband electromagnetic environment which is dominated by large electromagnetic interfering signals. It is demonstrated that the fundamental performance limits of a wideband high dynamic-range digital receiving system are directly determined by the ADC converter properties. Also, it can be shown that the dynamic range of a digital receiving system can be significantly greater than the dynamic range of analog-to-digital converters and can be increased to meet mission dynamic-range requirements by increasing the numbers of analog-to-digital converters in the system and by using the segmentation property of the Steinbrecher metasurface.

The electromagnetic radiation interface is suitable for use with radio-wave frequencies. A surface is provided with a plurality of electrically-conductive segmentation elements. A corresponding plurality of termination sections are provided so that each element pair is terminated with a termination section. The termination section may comprise one or more different termination packages for operating on received electromagnetic radiation and/or producing desired reflections and transmissions. In one embodiment, switches and termination packages may be implemented within integrated circuits wherein the switches may be utilized to switch between different termination packages. The termination packages may include selected fixed reactances and/or modulators designed to produce desired reflections (e.g. Doppler effects give the impression that the surface of the interface is moving at a speed different than the actual speed).

The range of signal amplitudes in a broadband electromagnetic environment can be significantly greater than the dynamic range of commercially-available ADCs. ADCs are limited to be used as RF-to-Digital converters in wideband software-defined radio applications. One way to resolve this problem is to limit the analog bandwidth of the software-defined radio pre-amplifier or to automatically limit the gain of the analog pre-amplifier that precedes the ADC. Another way to resolve this problem is to incorporate an analog beam-forming apparatus in order to reject the large signals before the signals can interfere with the analog-to-digital conversion process—which implies dynamic control of the analog beam-forming system. In either case, the result is a comparatively costly system incorporating limited-use components.

Commercial ADCs are used in numerous applications. ADC cost is steadily decreasing as the costs follow industry standard learning curves while ADC performance is steadily increasing as silicon processes continue to advance in innovation. However, the dynamic-range performance of commercial ADCs increases at a slower rate because the bulk of commercial applications can be met with current technology.

The Steinbrecher reference teaches a method for reducing the signal level applied to each ADC while maintaining a wide bandwidth for receiving signals and while maintaining adequate sensitivity to receive the smallest desired signals in the presence of large in-band interfering signals. The segmented metasurface of the Steinbrecher reference provides an efficient method for managing the signal level in a plurality of signal channels.

The partitioned aperture provides a capability to limit the power captured and fed to each ADC. Each ADC receives the power captured by one epixel while the system receives the power captured by the eplane comprising the sum of all epixels. Thus, the capture area of one epixel establishes the maximum incident power level for the system while the total eplane capture area establishes the minimum detectable signal level for the system. Since the epixel and eplane capture areas are independent of frequency, the instantaneous bandwidth can be as large as the Nyquist bandwidth of the ADCs—which is the primary bandwidth objective.

In addition to the improvements of the cited references, a preference still exists for a procedure to optimize the design of the partitioned air-interface metasurface. The optimized procedure could be based on the performance of a specific ADC and on mission environment signal parameters. ADC performance parameters and the mission environmental parameters comprising the largest signal to be tolerated and the smallest signal to be received will bound and determine the optimum system design parameters.

SUMMARY OF THE INVENTION

It is therefore a general purpose and primary object of the present invention to optimize the design of a digital receiving system in which the system includes a partitioned air-interface metasurface.

In order to attain the objective described, the analog-to-digital (ADC) boundary is positioned close to the air interface where propagating electromagnetic energy is captured. This positioning allows almost all radio signal acquisition to be functionally moved into the digital domain. Such positioning significantly reduces the cost and complexity of a wideband multifunction signal acquisition system and significantly increases the signal dynamic range above the boundary set by available ADC technology.

The present method circumvents the ADC dynamic-range problem by limiting the signal energy processed by a single ADC. The signal energy is limited by reducing the capture area of one epixel. The maximum signal power reaching one ADC is the product of the capture area measured in square meters of one epixel and the largest signal power density measured in Watts per square meter. The maximum power density that can be tolerated by the system is the power density incident on one epixel that produces a full scale signal on the ADC associated with that epixel.

In addition, the dynamic range limit of the ADC is circumvented by increasing the number of ADCs that are necessary to accommodate the largest signals in the mission environment while simultaneously maintaining adequate sensitivity to fulfill the mission small-signal requirements. The minimum detectable signal (MDS) is determined by the system noise figure "$F_{SYS}$" and the detection bandwidth "$B_{MDS}$" used to define the MDS. $F_{SYS}$ and $B_{MDS}$ are both independent of the number of epixels.

However, the system must acquire enough power from an incident small signal to meet the MDS requirement. This is accomplished by increasing the number of epixels until the total capture area (which is the sum of the capture areas of the plurality of epixels) is adequate to capture the power equivalent of the MDS from a small incident signal. The fundamental limit defines "p"—the number of epixels required by the system. The digital images of the signal power captured by each epixel are combined in a digital signal processor to form a single digital image of the total power captured by all epixels.

To improve existing systems, the present method teaches a wideband signal receiving system with adequate dynamic range to match the mission signal environment. Furthermore, the present method teaches that available ADCs can be used in most wideband applications requiring a large dynamic range provided that the signal levels do not exceed the maximum signal levels that can be processed by the available ADCs.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

1) Operating Frequency and Instantaneous Bandwidth

In the present invention, an instantaneous signal bandwidth is chosen that is less than or equal to one-half of the analog-to-digital converter (ADC) sampling frequency, the bandwidth being known as the Nyquist bandwidth (the background "Nyquist" theorem is well-known to those ordinarily skilled in the art). The detection bandwidth is typically much smaller than the instantaneous bandwidth and is the minimum bandwidth associated with the minimum detectable signal (MDS). The MDS is equal to the system noise power in the detection bandwidth.

An ADC frequency response band comprises a plurality of equal bandwidth contiguous Nyquist zones that form a continuous frequency band from zero frequency to multiples of the sampling frequency. A signal entering the ADC process in any one of these Nyquist bands is aliased to all other Nyquist bands by the sampling process. The aliasing process is well known to those ordinarily skilled in the art.

In some applications, the first Nyquist zone (adjacent to zero frequency) is the chosen operating band and the ADC is preceded by a frequency translator that shifts the desired signal band into the first Nyquist zone. In other applications, another of the Nyquist zones is chosen as the operating band. In these applications, the ADC process acts simultaneously as a down-converter and as an ADC.

A major advantage of a wideband signals acquisition architecture is that the fixed-frequency local oscillators and fixed-frequency sampling clocks can be carefully designed to minimize phase noise and eliminate spurious frequency components in these signals. When a large signal is present in the signal path of a system that contains a frequency translator or an ADC, the phase noise of the local oscillator and the phase noise of the ADC clock are transferred to the large signal by a process known in the art and to those skilled in the art as "reciprocal mixing". The ADC clock is the stable low-phase-noise spurious-free frequency source that generates the sample frequency used by the ADC. Reciprocal mixing significantly masks the small signals that are near the large signals in the system acceptance band, which leads to reduced sensitivity in almost all narrow band receivers that require a tunable synthesizer. A superheterodyne receiver is just one example.

In the case of the methods described herein, all of the locally generated signals can be "cleaned" of phase noise and spurious signals before mixing with the analog input signal spectrum. Therefore, if the steps of the method are taken, the problems associated with reciprocal mixing are almost non-existent in the disclosed architectures.

In almost all cases, each ADC is preceded in the analog domain by a band-limiting filter which is commonly referred to as the "anti-aliasing" filter. The anti-aliasing filter prevents signals outside the chosen Nyquist zone from being aliased into the desired frequency band. In all cases, the digital representation created by the ADC is interpreted to be in the first Nyquist zone.

The process of converting an analog signal to an equivalent digital image comprises a quantizing step and a sampling step. The function of the quantizing step is to resolve the voltage amplitude of the analog signal into discrete steps, each of which is an integer multiple of a smallest step that is called the 'least significant quanta' and is given the symbol 'Q' (Q is expressed in Volts). The function of the sampling step is to establish a time associated with each quantized value. Samples are recorded at integer multiples of a base sampling period—which is the reciprocal of the sampling rate.

The total number of steps in the quantizer process is $2^N$ [2 exp(N)] in which "N" represents the number of binary bits required to specify each quantizer step. The quantizer is symmetrical so that the peak positive voltage is equal to the peak negative voltage and the magnitude of each is equal to $Q2^{(N-1)}$, which may also be written as [Q×2exp(N−1)]. The peak-to-peak quantizer voltage or full-scale quantizer voltage is $Q2^N$ or [Q×2exp(N)].

The difference between the analog input voltage to the quantizer and the output voltage steps constitutes a quantization error voltage—which appears as additive quantization noise in the input of the analog-to-digital conversion process. In other words, the quantization noise comprises the complex signal that must be added—like noise—to the piecewise continuous input signal in order to get the stepwise quantized signal that is digitally represented at the ADC output. It is generally accepted that the equivalent RMS quantization noise power is $Q^2/12$ Watts, which may also be written as ((1/12)×Qexp2) Watts, when a sinewave signal with peak-to-peak amplitude of $Q2^N$, or (Q×2exp(N)), is quantized. For an ideal ADC, the quantization noise constitutes the only source of noise and distortion associated with the ADC process.

The method herein assumes the properties of an ideal ADC and derives the system parameters based on the ideal ADC properties. The parameters that characterize the pre-amplifier preceding the ADC can be derived from the ADC properties combined with the overall system specifications that define the minimum detectable signal.

The ADC input voltage is periodically sampled at a rate $f_{sample}$ and each sample is converted into an N-bit digital word that represents the voltage quantization interval in which the input voltage falls at the time of the sample. The sampling process generates frequency components that are multiples of the sampling frequency plus the frequency components of the input signal—which results in the aliasing process.

Aliasing creates copies of the input signal frequency components associated with each harmonic of the same sampling frequency. These frequency components can be determined by convolving the input signal frequency spectrum with an impulse train representing the frequency harmonics of the sampling frequency. In a more specific description of the Nyquist criteria, a problem results if the input signal frequency spectrum extends beyond a bandwidth equal to one half of the sample frequency because the aliasing process will cause band overlap.

The Nyquist theorem states that the input voltage waveform can be reconstructed from the resulting digital image as long as $f_{sample}$ is at least twice the highest frequency component of the input voltage waveform. The Nyquist theorem ensures that there will be no band overlap resulting from the aliasing process.

In order to fulfill the Nyquist criteria, it is necessary to provide an anti-aliasing low-pass or band-pass filter in the analog signal path prior to the ADC. The bandwidth of the anti-aliasing filter must be less than one-half of the sample frequency. It also follows that the instantaneous bandwidth of a digitized receiving system cannot be greater than one half of the sample frequency of the digitizing ADC. The ADC input frequency band is partitioned into contiguous Nyquist bands, each of which has a bandwidth equal to one half of the sample rate. Each of these bands is called a Nyquist zone.

An input signal entering any Nyquist zone is aliased into all other Nyquist zones by the sampling process. In some special purpose systems, the Nyquist criteria is deliberately violated by allowing signals in more than one Nyquist zone. However, the ADC digitized output still only represents the first Nyquist zone in that there is an inherent ambiguity for each output signal that is equal to the number of allowed input Nyquist zones.

In summary, an ideal ADC can be characterized by: a) the sample rate; b) the number of bits in each sample; and c) the peak-to-peak input voltage that can be quantized—which is also known as the full-scale input voltage. The present method assumes that the ideal ADC is noiseless (except for the quantization noise) and that the ADC does not create intermodulation distortion products but does alias the frequency components of the input signal into every Nyquist zone of the ADC.

2) Method for Adapting a Software-Defined Air Interface System Design to a Mission Signal Environment A mission signal environment comprises a plurality of large signals and a plurality of small signals. The optimum performance of a software-defined air interface will be realized if linear digital replicas of the largest signals and the smallest signals can be simultaneously created in the digital domain. The magnitude of the combined signals at the air interface may be significantly larger than the magnitude of any one signal. For example, if "Y" equal-amplitude signals are present at the interface, the peak voltage of the combined spectrum is 20×LOG(Y) dB greater than the amplitude of any one signal. LOG (Y) means the logarithm to the base 10 of Y.

For the purpose of the method taught herein, it is assumed that there is one large signal that dominates the mission signal environment and one small signal that must be successfully processed for the mission to succeed. The assumption of the one largest signal is justified on the basis of simplification because the mission signal environment analysis can define the expected peak voltage level and one large signal with the same peak voltage level can be used when implementing the method.

The smallest signal is considered first. The properties of the smallest signal that affect the system design are the MDS bandwidth, the required signal-to-noise ratio and the MDS power density at the air interface. In conjunction with clarifying throughout the specification, the method defines the number of epixels required—based on a set of independent variables that define the system requirements. The minimum detectable signal, MDS, system noise figure $F_{SYS}$ and detection bandwidth, $B_{DET}$ are independent variables specified by the system requirements. The number of bits N, the quantization interval Q and the sample frequency $f_{sample}$ are the independent variables associated with the ADC. The two energy densities, the maximum interfering signal density, $W_{XIS}$ and the minimum detectable signal density, $W_{MDS}$ are independent variables associated with the mission requirements; whereas the fundamental limit on the number of epixels p and the epixel capture area $A_{CE}$ are dependent variables.

The total capture area of the air interface multiplied by the MDS power density is equal to the total MDS signal power received by the system. Furthermore, the total MDS power received must be greater than the system noise power in the MDS signal bandwidth by the required signal-to-noise ratio. For the purpose of defining the fundamental limit, p, a unity signal to noise ratio is assumed. Thus, the total capture area of the interface $A_{CT}$ is determined by the system noise power and by the properties of the MDS.

The system of the previously-cited Steinbrecher reference comprises an air interface segmented into a plurality of equal area segments, which have been defined as epixels. The term "epixel" was chosen as an analogy to the pixels that define the focal plane of a digital camera. Each epixel, as described by the Steinbrecher reference resolves the polarization of the incident signal energy into two orthogonal vector components. The capture area of each epixel is the same for each of the two orthogonal vector components. Each epixel has two broadband signal ports associated with the two orthogonal polarization vector components of the electromagnetic wave front that is captured by the air interface. Thus, the air interface with p epixels will have "2p" output ports such that p output ports are associated with one incident-wave polarization vector component and p output ports are associated with the orthogonal incident-wave polarization vector component.

The polarization vector components are aligned with the physical orientation of the Steinbrecher reference partitioned air interface so that the polarization of the incident signals can be determined by separately processing the two orthogonal components. Since the polarization of the incident signals is generally unknown and may change in unpredictable ways, it is necessary that each of the two orthogonal channels be capable of independently processing the MDS and the largest signal in the environment. Thus, a typical signal-acquisition system will comprise two independent systems, each of which produces a digital image of one of the two orthogonal polarization components. These digital images can then be co-processed in the digital domain in order to dynamically track the polarization of the incident signal energy comprising each independent signal. This process adds another value which is observable to the signal acquisition process.

Re-stated, the total capture area of the air interface is equal to the sum of the capture areas of the individual epixels so that the total power captured by the air interface is p-times the total power captured by one epixel. This is true for each polarization vector component.

Each of the 2p output ports feeds a signal path comprising a pre-amplifier with an anti-aliasing filter followed by an ADC. The bandwidth of the anti-aliasing filter is assumed to be less than one half of the ADC sampling frequency in accordance with the Nyquist theorem and may be many times the MDS bandwidth requirement.

The input bandwidth of the ADC comprises a plurality of contiguous frequency bands, each with a bandwidth equal to the Nyquist bandwidth of the ADC. The Nyquist bandwidth is equal to one half of the ADC sample rate and only one Nyquist band is used in the disclosed method. The function of the anti-aliasing filter in each signal path is to allow signal energy to enter the ADC only in the Nyquist band being used and to prevent signal energy from entering the ADC in any other Nyquist band. The anti-aliasing filter is said to have a "pass-band" that allows signal energy to pass into the ADC Nyquist band being used and is said to have a "stop band" that prevents signals entering any of the other Nyquist bands.

The 2p signal paths are assumed to be physically identical and are assumed to have identical signal processing properties. The analog pre-amplifier preceding the ADC in each signal path may also include a frequency translator that translates a desired operating frequency band into the pass-band of the anti-aliasing filter.

The outputs of the 2p signal paths are combined in a digital signal processor that has adequate signal dynamic range to linearly process all of the received signals. The received signals will include the largest signal and the smallest signal. The output of the digital signal processor is a digital replica of the electromagnetic wave energy incident on the air interface.

The digital process of signal-combining may include static or dynamic complex weights that are adjusted in accordance with algorithms that accomplish beam-forming, polarization tracking, multipath abatement and/or scintillation abatement as well as other enhancements that improve the smallest signal detection capability in the presence of the largest signal.

3) System Noise and Noise Figure Associated with Each Signal Path

Each signal path comprises a pre-amplifier, which may also include a frequency translator that is followed by an ADC. The pre-amplifier must provide the system selectivity by means of an imbedded anti-aliasing filter that defines the ADC input Nyquist zone being used. The pre-amplifier source impedance is defined by the air interface signal port and the pre-amplifier output impedance is associated with the port that feeds the ADC input port. The pre-amplifier noise figure is defined as a ratio of ratios wherein values are expressed in terms of available power and wherein the source impedance is at a temperature designated as $T_0$ which is approximately equal to 290 Kelvin.

The noise figure of a two-port device is defined as (available signal power)-to-(available noise power) ratio from the source connected to the input port divided by the (available signal power)-to-(available noise power) ratio from the output port. The use of available power terms is consistent with the historical development of noise theory. Furthermore, the available gain of an amplifier is defined as the ratio of the power available from the output port divided by the power available from the source connected to the input.

The noise theory also predicts that the RMS noise power density available from a resistor is $k \times T_R$ wherein "k" is the Boltzmann constant (Boltzmann constant=$1.3806503 \times 10^{-23}$ m$^2$ kg s$^{-2}$k$^{-1}$) and "$T_R$" is the Kelvin temperature of the resistor. Noise power density is measured in Watts/Hertz. The available noise power is independent of the Ohmic resistance of the resistor and depends only upon the resistor temperature. For this reason, classical noise theory often refers to a 'noise temperature' rather than a noise figure.

Pre-amplifier signal-to-noise ratio degradation results from the amplifier noise that is added as the signal passes through the amplifier. The noise added by the pre-amplifier can be represented by an increase in the temperature of the source resistance that produces the same amount of noise as the amplifier. Thus, the noise power density available from the input source can be expressed as $k \times (T_0 + T_A)$ in which $T_A$ represents the noise temperature of the pre-amplifier. Then, the signal-to-noise ratio degradation of the amplifier is $(T_0 + T_A)/T_0$. It follows that $T_A = (F-1) \times T_0$, which defines the amplifier noise figure "F". By convention, the noise figure is only defined when the temperature of the source resistance is $T_0$.

If the available gain of the pre-amplifier is $G_A$, then the noise power in a bandwidth (B) available from the amplifier output is $P_{NAO} = G_A \times k \times (T_0 + T_A) \times B$. The only other noise source included in the analysis of the signal path is the ADC quantization noise. Following the noise theory convention, the quantization noise can be represented by an equivalent increase in the source noise temperature, $T_Q$. The quantization noise is uncorrelated with any of the noise sources so that the quantization noise temperature is additive at the input source. Thus, the total noise temperature of the pre-amplifier input source is $T_0 + T_A + T_Q$ and the total noise power in a bandwidth available from the pre-amplifier output port is $P_{NAO} = G_A \times k \times (T_0 + T_A + T_Q) \times B$. The contribution of the quantization noise is $P_{QNAO} = G_A \times k \times (T_Q) \times B$.

The ADC full-scale signal level is definable in terms of the sinewave power available from the pre-amplifier output, $P_{FSAO}$, that creates a peak-to-peak sinewave signal in the ADC that is approximately equal to the full-scale range of the quantizer. Then, the sinewave power available from the pre-amplifier output that creates a peak-to-peak sinewave signal in the ADC that is approximately equal to a least significant bit, or Q, is $P_{QAO} = 2 \exp(-2N) P_{FSAO}$. Since the RMS value of the quantization noise is $(1/12) \times Q \exp 2$, the total quantization noise power expressed as available power from the pre-amplifier output is $P_{TQNAO} = (2/3) \times 2 \exp(-2n) P_{FSAO}$.

The quantization noise power density is determined by dividing the total quantization noise power by the Nyquist bandwidth. Thus, $P_{QNAO} = (2/3) \times 2 \exp(-2n) (P_{FSAO}/f_N)$, which is also equal to $G_A \times k \times (T_Q)$ and defines the equivalent input quantization noise temperature, $T_Q$:

$$T_Q = \left(\frac{2}{3}\right) \frac{2^{-2N} P_{FSAO}}{k G_A f_N} \tag{1}$$

In Equation (1):
$T_Q$=Equivalent input quantization noise temperature;
N=Number of ADC quantization bits;
$P_{FSAO}$=Available sinewave power at a pre-amplifier output that creates a full scale peak-to-peak signal in the ADC quantizer;
k=Boltzmann's constant: $1.3806 \times 10 \exp(-23)$ Joules/(degree Kelvin);
$G_A$=Pre-amplifier available gain; and
$f_N$=ADC Nyquist frequency.

The MDS will be determined by the system noise figure $F_{SYS}$ which can now be expressed in terms of the pre-amplifier noise temperature, $T_A$, and the equivalent ADC quantization noise temperature, $T_Q$:

$$F_{SYS} = \frac{T_0 + T_A + T_Q}{T_0} \tag{2}$$

In Equation (2):
$F_{SYS}$=the system noise figure of a signal channel comprising a pre-amplifier and an ADC;
$T_0$=Standard temperature (290 degrees Kelvin);
$T_A$=Pre-amplifier equivalent noise temperature; and
$T_Q$=Equivalent quantization noise temperature.

4) Pre-Amplifier Design Constraints

System sensitivity, or MDS, is determined by $F_{SYS}$—as expressed in Equation (2). The pre-amplifier equivalent noise temperature, $T_A$, which is specified by the pre-amplifier noise figure, is an independent system variable that depends on the pre-amplifier design. The equivalent quantization noise temperature, $T_Q$, depends on the choice of the ADC parameters and on the $G_A$ of the pre-amplifier.

Consider, as one design example, that the pre-amplifier gain and noise figure are specified such that the system thermal noise contribution from the pre-amplifier is less than or equal to the system quantization noise contribution from the ADC, ($T_A \leq T_Q$). In this case:

$$T_A \leq T_Q = \frac{(F_{SYS} - 1)}{2} T_0 \tag{3}$$

In practice, amplifier noise temperature is generally specified to be less than or equal to some maximum value determined by the mission requirements. The pre-amplifier noise figure, $F_{PA}$, can be expressed in terms of the system noise figure, as follows:

$$F_{PA} \leq 1 + \frac{(F_{SYS} - 1)}{2} \quad (4)$$

Equation (3) and Equation (4) define the pre-amplifier noise figure constraint in terms of the system noise figure requirement, which is based on the system MDS. Taken together, Equation (3) and Equation (1) define the pre-amplifier $G_A$ constraint. In this case:

$$G_A = \left(\frac{2}{3}\right) \frac{2^{-2N} P_{FSAO}}{kT_0 f_N (F_{SYS} - 1)} \quad (5)$$

System MDS detection bandwidth, $B_D$, defines the minimum bandwidth of signals to be received by a system and is usually specified along with the system noise figure. The system detection bandwidth also defines the system MDS, which is a signal with a power level that is approximately equal to the total system noise power in $B_D$.

A third pre-amplifier design constraint that depends on $B_D$ defines the pre-amplifier linearity such that intermodulation distortion products that are generated by the pre-amplifier remain below the noise floor in the system $B_D$. The pre-amplifier linearity constraint is specified by the pre-amplifier output third-order intercept (TOI) which is also expressed in terms of available power.

The TOI is a mathematical concept that relates to the onset of non-linearity in the transfer function of an amplifier. If the amplifier voltage transfer function is expressed as a Taylor series, then the TOI is specified by the coefficient of a cubic term in the Taylor series.

The TOI is determined by feeding the input of the amplifier with a two-tone signal that is made up of two equal amplitude signals at power levels $P_{TT}$ and at frequencies $f_{TT1}$ and $f_{TT2}$. By convention, the power amplitude of a two-tone signal is the power amplitude of each tone. Third-order intermodulation distortion products that appear in the pre-amplifier output at frequencies $(2 \times f_{TT1} - f_{TT2})$ and $(2f_{TT2} - f_{TT1})$ also form a two-tone and by convention are characterized by the amplitude of one of the distortion products. The distortion amplitude is measured and compared with the amplitude of the generating two-tone in order to determine the intermodulation distortion ratio, IMR. IMR is defined as the ratio of the two-tone power to the third distortion power and is typically expressed in dB.

Since the intermodulation distortion products are the result of third-order nonlinearity in the pre-amplifier transfer function, the IMR will decrease by two dB for each one dB increase in the two-tone amplitude. This relationship is characterized by defining the TOI as the two-tone amplitude at which the IMR is equal to zero. The TOI is a mathematical construction that permits a calculation of the third-order distortion amplitude, $P_{TOD}$, when the two-tone amplitude, $P_{TT}$, is known. The relationship is:

$$P_{TOD} = \frac{(P_{TT})^3}{(TOI)^2} \quad (6)$$

Equation (6) is only valid when the distortion products are small compared to the generating two-tone amplitudes. The range of amplitudes over which Equation (6) is valid is sometimes called the "well-behaved" region of signal amplitudes.

The pre-amplifier linearity constraint will define the pre-amplifier output such that the $P_{TOD}$ measured at the pre-amplifier output will remain less than or equal to the total available system noise power, $P_{NAOB}$, at the pre-amplifier output in the detection bandwidth. The constraint is valid for all signal amplitudes less than the ADC full-scale amplitude, $P_{FSAO}$. Since the peak voltage amplitude of a two-tone signal is twice the voltage of each tone, the peak power amplitude of the two-tone is four times the peak power of each tone. It follows that the power amplitude of a two-tone signal with peak amplitude that is approximately equal to the ADC full scale amplitude is ($P_{FSAO}/4$), which leads to the following relationships:

Available pre-amplifier output noise power in the MDS detection bandwidth, $B_D$:

$$P_{NAOB_D} = kT_0 F_{SYS} B_D G_A \quad (7)$$

Available output third-order distortion power:

$$P_{TOD} = \frac{(P_{FSAO}/4)^3}{(TOI)^2} \quad (8)$$

The pre-amplifier linearity constraint (as expressed by the output third-order intercept) can now be obtained by equating Equation (7) and Equation (8) and solving for TOI:

$$TOI = \frac{1}{8} \frac{(P_{FSAO})^{\frac{3}{2}}}{(kT_0 B_D F_{SYS} G_A)^{\frac{1}{2}}} \quad (9)$$

Equation (9) contains the pre-amplifier available gain, $G_A$, which is expressed by Equation (5). Thus, $G_A$ can be eliminated by combining Equation (9) and Equation (5). The result is:

$$TOI = \frac{\sqrt{3}}{16} \left[ \frac{f_N (F_{SYS} - 1)}{B_D F_{SYS}} \right]^{\left(\frac{1}{2}\right)} 2^N P_{FSAO} \quad (10)$$

In summary, the pre-amplifier design constraints can be expressed in terms of the ADC properties, the required $F_{SYS}$ and the system MDS detection bandwidth. The pre-amplifier design constraints are as follows:

Pre-amplifier bandwidth: Greater than or equal to the Nyquist band, $f_N$,
Pre-amplifier noise figure, $F_{PA}$: Equation (4),
Pre-amplifier available gain, $G_A$: Equation (5), and
Pre-amplifier available third-order intercept Equation (10).

Thus, it has been demonstrated that, for a single channel, the pre-amplifier design constraints can be derived from the system noise figure requirement and the properties of the ADC that include the Nyquist bandwidth ($f_N$), the number of quantizer bits (N), and the sinewave power available from the ADC source (which is the pre-amplifier output) such that the peak-to-peak voltage is equal to the quantizer full-scale voltage. The next section is a derivation of the number of channels that will be necessary in order to meet a system signal dynamic range requirement.

5) System Signal Dynamic Range Constraints

It has been demonstrated that the properties of a single signal channel are constrained by the properties of the ADC selected for converting the RF signals of a single channel to a digital image. The software-defined air interface concept is driven by system signal dynamic range requirements that exceed the signal dynamic range of a single ADC.

The system dynamic range requirement can be expressed in terms of a largest signal and the minimum detectable signal (MDS) that must be captured in the presence of the largest signal. The frequency separation of the two signals is assumed to be greater than the combined bandwidths of the two signals. The two defining signal intensities can be expressed in terms of power densities at an air interface. It is also assumed that the air interface is segmented into p epixels, which results in 2p signal channels in the software-defined signal acquisition system.

The number of signal channels is twice the number of epixels since each epixel feeds two signal channels corresponding to two orthogonal components of the polarization vector. The partitioned air interface resolves the polarization vector of an incident electromagnetic wave into two orthogonal scalar components, each of which feeds one signal channel. The orthogonal components specify the polarization of the incident electromagnetic wave.

Generally, the polarization of signals in an environment will not be known in advance so that each polarization vector signal channel must be capable of processing the expected power level of the largest signal in the environment. It may appear that this constitutes a doubling of the number of channels and results in an expensive redundancy. This would be true in cases where the polarization properties of the desired signal and the interfering signal are unchanging and identical to each other. However, in the more generally used 'worst' case, it is assumed that the polarizations of the two signals are unknown and may change in unpredictable ways during the signal acquisition process.

If $A_{CE}$ is the capture area of one epixel, then the total capture area of the air interface ($A_{CT}$) is ($p \times A_{CE}$) because the total area of the air interface is segmented into p equal-area epixels. If each ADC is to remain within quantizer limits, then the maximum signal power available from one epixel port, $P_{AEmax}$ cannot exceed $(P_{FSAO})/G_A$:

$$P_{AEmax} = \frac{P_{FSAO}}{G_A} = \left(\frac{3}{2}\right) kT_0 f_N (F_{SYS} - 1) 2^{2N} \quad (11)$$

Equation (11) defines the maximum available signal power from one epixel port such that the ADC quantizer remains below full scale. The implicit assumption in the maximum available signal power constraint is that the pre-amplifier available gain has been set such that the system noise figure constraint can be met. Thus, only $F_{SYS}$ appears in the constraint.

The MDS is defined in terms of available signal power, $P_{Amds}$, when the available signal power is equal to the available noise power in the signal detection bandwidth, $B_D$:

$$P_{Amds} = kT_0 F_{SYS} B_D \quad (12)$$

The ratio of the large signal power defined by Equation (11) and minimum detectable signal power defined by Equation (12) is the signal dynamic range of a one-channel, p=1, system. However, the properties of the patented Steinbrecher software-defined air interface system allow the signal dynamic range to be increased in accordance with the mission signal environment. The functionality of the air interface is defined by the software that processes the received signals. For example, resolving the dynamic polarization of multiple signals can be accomplished in software. Similarly, the signal-to-noise ratio of each received signal can be maximized in the software processor.

The largest signal component of the mission signal environment can be specified in terms of power density, $W_{XIS}$, expressed in Watts/(square meter) at the air interface. Similarly, the minimum detectable signal in the mission signal environment can be specified in terms of power density, $W_{MDS}$, expressed in Watts/(square meter) at the air interface. Thus, the mission signal dynamic-range requirement, $SDR_{mission}$, can be defined in terms of the signal power densities at the air interface:

$$SDR_{mission} = \frac{W_{XIS}}{W_{MDS}} \quad (13)$$

Also, the capture area of one epixel can be specified in terms of the large signal power density and $P_{AEmax}$ as defined by Equation (11):

$$A_{CE} = \frac{P_{AEmax}}{W_{XIS}} \quad (14)$$

The total small-signal power captured by the air interface must be at least equal to the minimum detectable signal power as expressed by Equation (12). Furthermore, the total capture area of the air interface, $A_{CT}$, is equal to $PA_{CE}$ so that the total MDS power is:

$$P_{Amds} = p \frac{P_{AEmax}}{(SDR)_{mission}} \quad (15)$$

The result, when Equation (15) is solved for the required number of epixels, is:

$$(\text{Number of epixels}) = p = \left(\frac{2}{3}\right) \frac{B_D}{f_N} \frac{F_{SYS}}{(F_{SYS}-1)} 2^{-2N} SDR_{mission} \quad (16)$$

It follows that the number of signal channels is 2p. The conclusion to be drawn from Equation (16) is that the required number of epixels and the required number of signal channels in the software-defined air interface is determined by ADC properties, system noise figure, signal detection bandwidth and the mission environment signal dynamic range.

A further conclusion is that Equation (16) expresses a limit on the number of parallel ADC channels required to achieve a given mission signal dynamic range. It follows that the Steinbrecher software-defined air interface represents a design with the minimum complexity, as measured by the number of parallel channels, required to achieve a given signal dynamic range in a signals intercept receiver.

Figure 1:
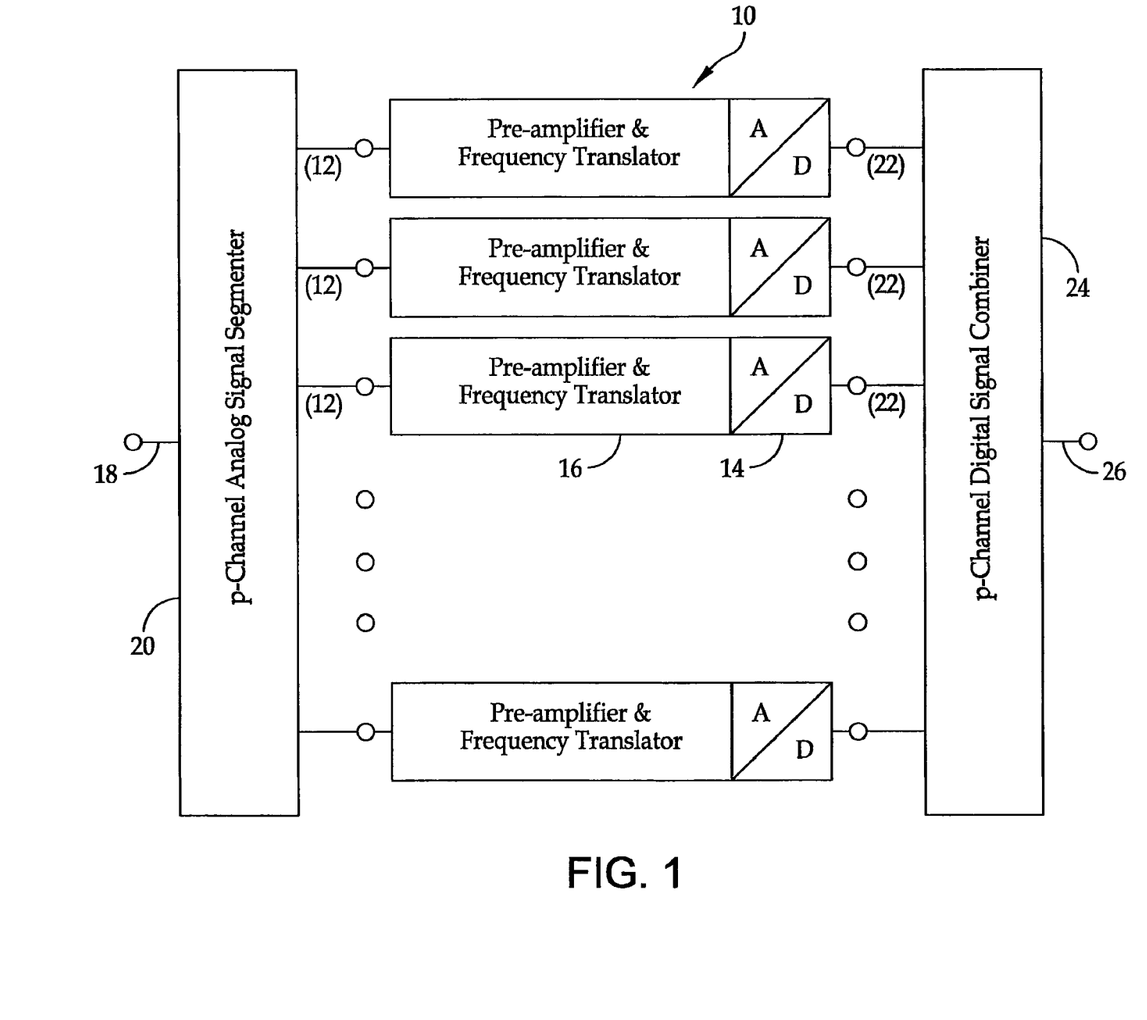
FIG. 1 depicts a segmented p-channel digital receiver configuration.

Exemplifying the operation of the present invention, FIG. 1 illustrates a configuration 10 of a broadband digital receiver. If a p-channel signal segmenter 20 is the air interface of the Steinbrecher reference, then the configuration 10 represents the processing system associated with one polarization vector component and a second identical system is required for the orthogonal polarization vector component.

Additional signal processing will be necessary in order to combine the two polarization vector components and to recover the polarization of the incident signals. The configuration 10 comprises a plurality of identical channels 12. Each channel 12 consists of an analog-to-digital converter 14 preceded in the signal path by a frequency-selective pre-amplifier 16.

The pre-amplifier 16 limits the signal bandwidth to be less than one Nyquist bandwidth. The frequency-selective pre-amplifier 16 may also incorporate a frequency translator that translates a desired signal band into one of the Nyquist zones of the ADC 14.

An analog signal entering a signal port 18 of a signal segmenter 20 is segmented into equal amplitude signals that are fed to the input ports of the independent pre-amplifiers 16. The total power contained in the p signal segments is converted to a digital image by the ADCs 14 resulting in p digital data streams that are fed to input ports 22 of a digital signal combiner 24. The signal combiner 24 computes the weighted digital sum of the p digital channels and presents the result as a digital data stream at a combiner output port 26.

The signal combiner 24 applies individual weights to each of the p digital data streams before computing the weighted digital sum. For example, the individual signal channels 12 may accumulate differential phase shifts that need to be equalized by applying individual weights to the p channels before combining the p digital signals. One method (as disclosed in the Steinbrecher reference) of deriving the individual weights is to inject an observable with known differential phase into the input of each channel and comparing each observable with a reference at the output of each channel.

Figure 2:
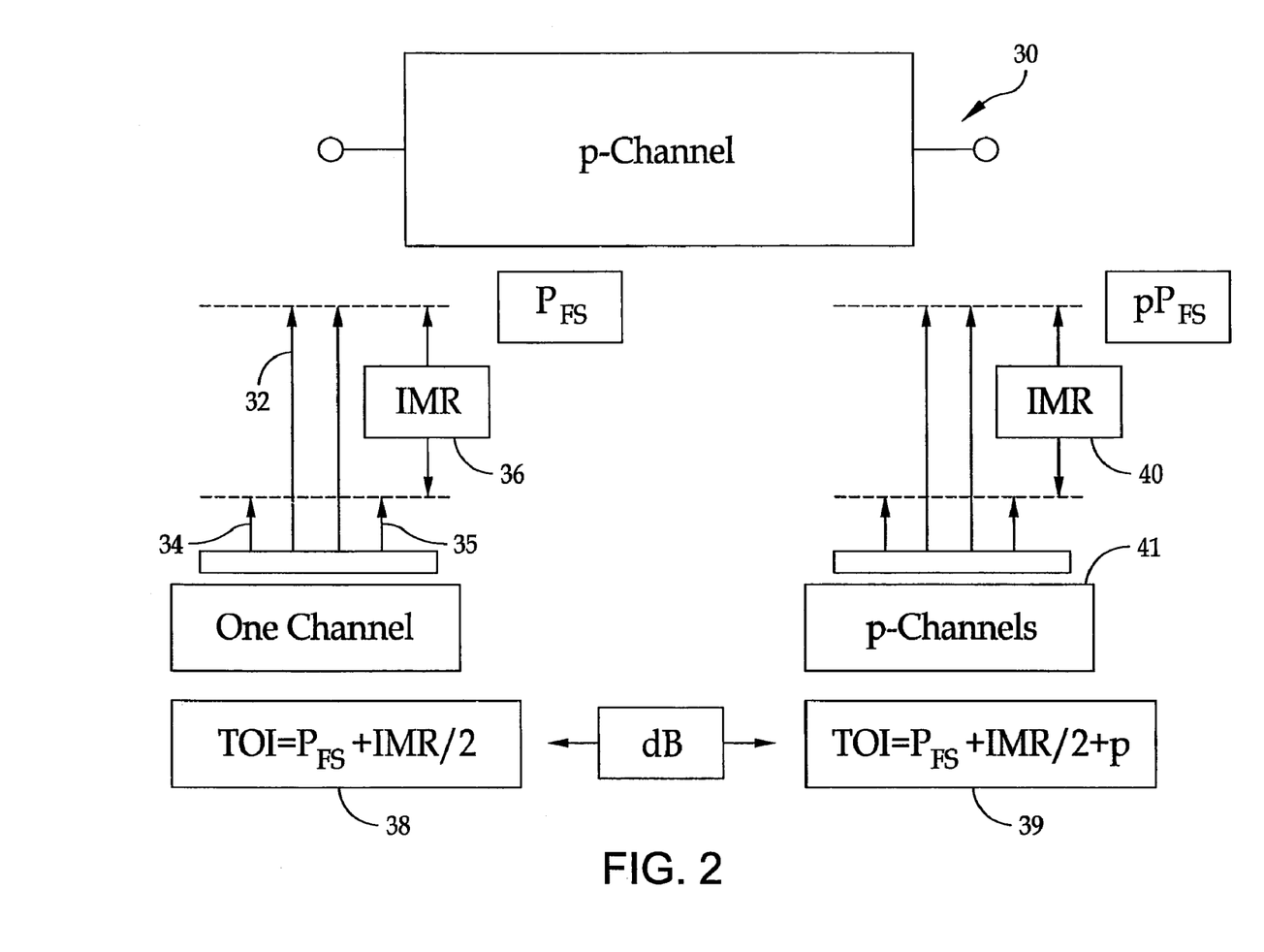
FIG. 2 depicts a Third-Order Intercept (TOI) for a p-channel digital receiver configuration.

FIG. 2 illustrates a configuration of a p-channel receiver 30 comprising an assembly of p identical signal channels with analog inputs and digital outputs combined (as illustrated in FIG. 1) in order to form a two-port network. The non-linearity of each signal channel and the non-linearity of the combined p-channels can be characterized by a two-tone measurement of the third-order intercept (TOI) which is based on the power ratio between a two-tone signal 32 and the third-order distortion products 34, 35 resulting from non-linearities in the signal path.

The intermodulation power ratio (IMR 36) resulting from a third-order nonlinearity in the signal path decreases by two dB for each single dB increase in the power level of the two-tone excitation 32. Thus, there exists a theoretical two-tone power level for which the IMR 36 is approximately zero. The two-tone power level at which this approximation would occur is defined as the third-order intercept (TOI) and is equal to the two-tone power level expressed in dB relative to one-Watt, dBW, plus the IMR 36 expressed in dB.

When the signal path includes an ADC, the measurement is made when the peak amplitude of the two-tone excitation is approximately equal to the ADC full scale available power in the pre-amplifier output. For one channel, p=1, the TOI is expressed in box 38 while for p>1, the relationship is expressed in box 39. If the p channels are assumed to be identical, then the IMR 40 for p channels 41 will be the same as the IMR 36 for one channel. However, the power required to reach full scale on p ADCs is p times the power required to reach full scale on one ADC. Thus, the TOI for a p-channel configuration is p-dB greater than the TOI for one channel.

Figure 3:
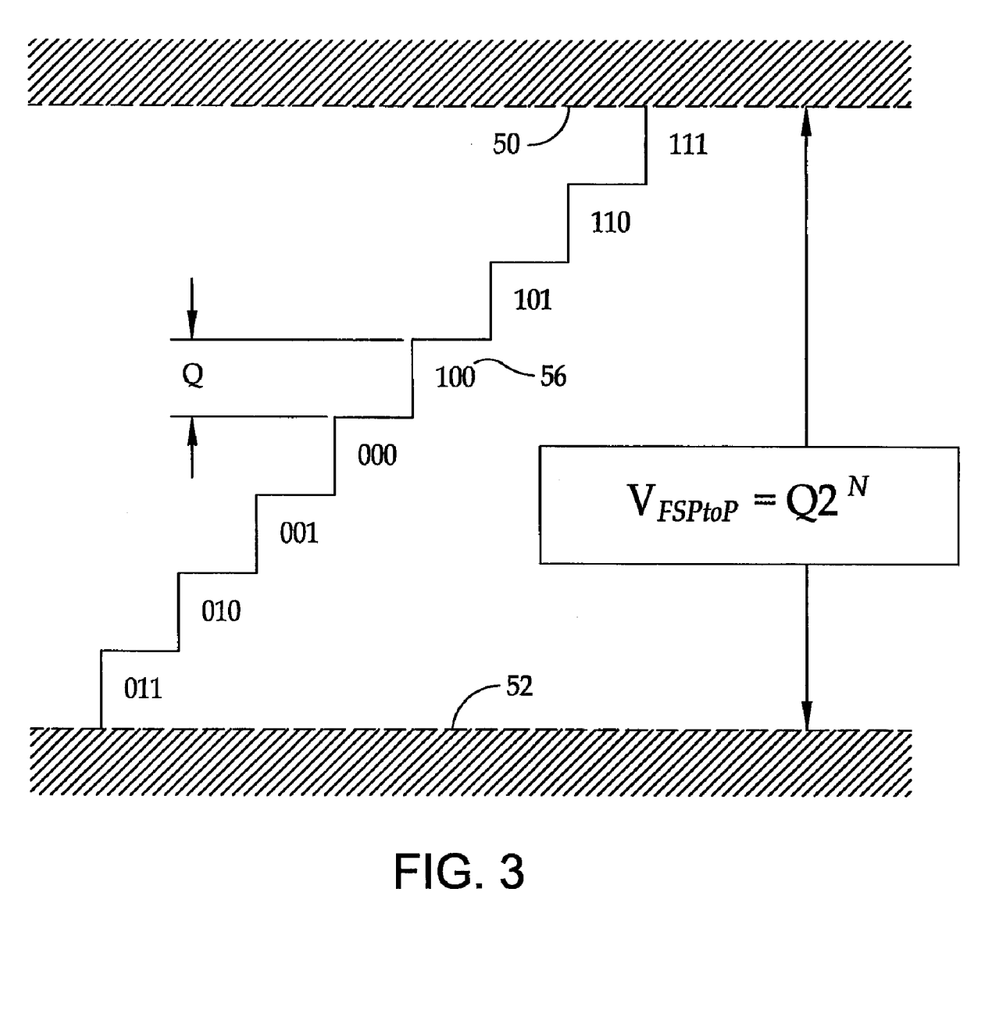
FIG. 3 depicts an 8-Step, N=3, Quantizer.

FIG. 3 illustrates the function of a voltage quantizer by partitioning a voltage function into intervals that can be specified as binary number multiples of a defined quanta "Q". The full range of the quantizer between the maximum positive voltage 50 and the maximum negative voltage 52 is termed the full-scale peak-to-peak voltage "$V_{FSPP}$" which is approximately equal to the number of quanta, $2^N$, times the voltage amplitude of the basic quanta, Q.

Each quanta interval in the quantizer "staircase" is assigned a binary number 56 and a voltage falling anywhere in the interval is represented by the binary number assigned to that interval. A periodic clock is used to query the quantizer and to recover the current binary value of the voltage being quantized. In this way, a time-varying voltage is converted into a periodic time sequence. The result is a digital replica of the continuous analog voltage function applied to the quantizer.

Figure 4:
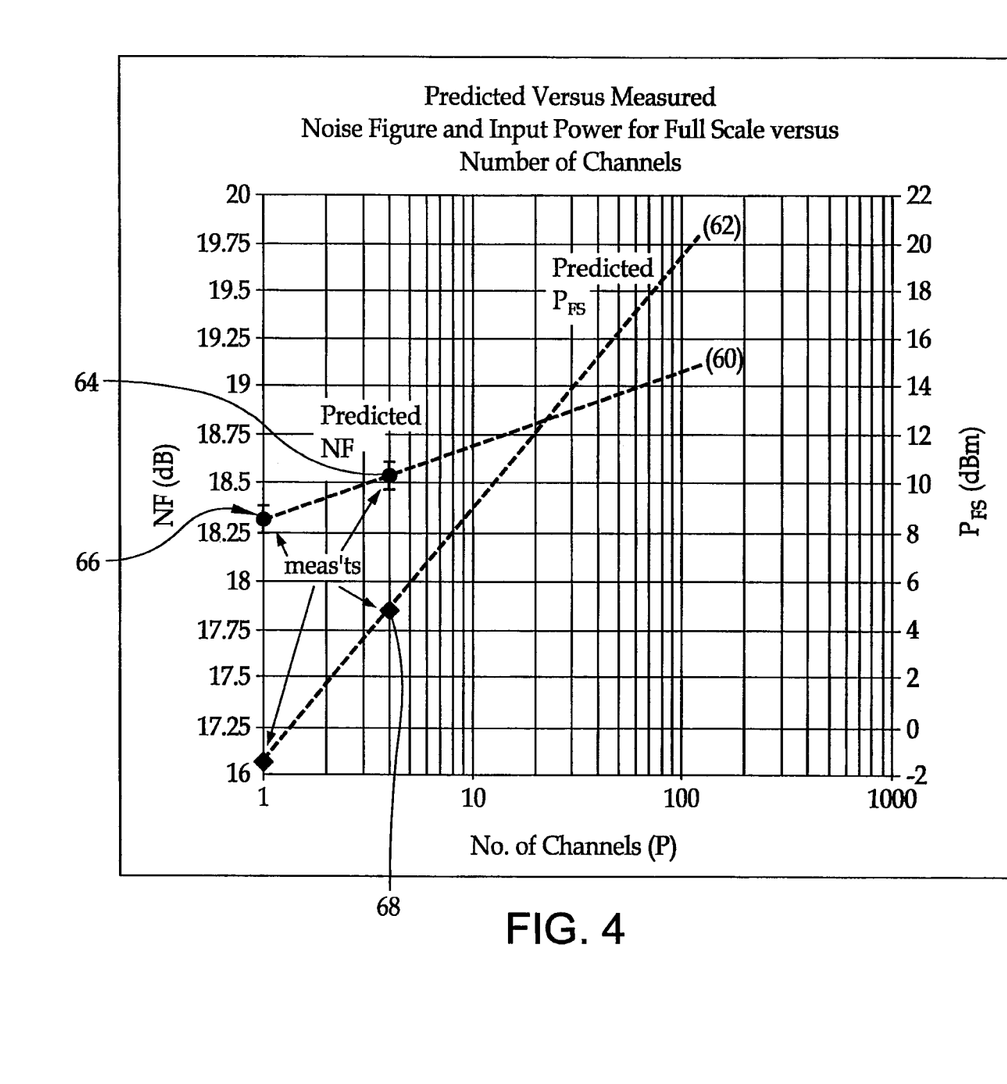
FIG. 4 depicts measured results for p=1 and p=4.

FIG. 4 illustrates the test results of a one-channel system and a four-channel system. The graph of the figure displays the system noise and the full-scale input power as a function of the value of "p". The theoretical noise figure 60 is expected to increase incrementally with the small added loss associated with the passive input-signal segmenting device. The theoretical full scale input power 62 is expected to increase as the value of p. Thus, for p=4, a 6 dB increase in the full scale input power is expected.

For p=1, the measured noise figure was determined to be 18.3 dB and for p=4, the measured noise figure 64 was 18.6 dB. The increase of 0.3 dB agrees favorably with the measured loss of the passive signal segmenting device that was used to create four channels from one channel.

For p=1, the measured full scale input power 66 was measured to be −1.8 dB. For p=4, the measured full scale input power 68 was measured to be 4.5 dB. The increased of 6.3 dB is greater than the expected 6 dB by the 0.3 dB loss of the signal segmenting device.

Figure 5:
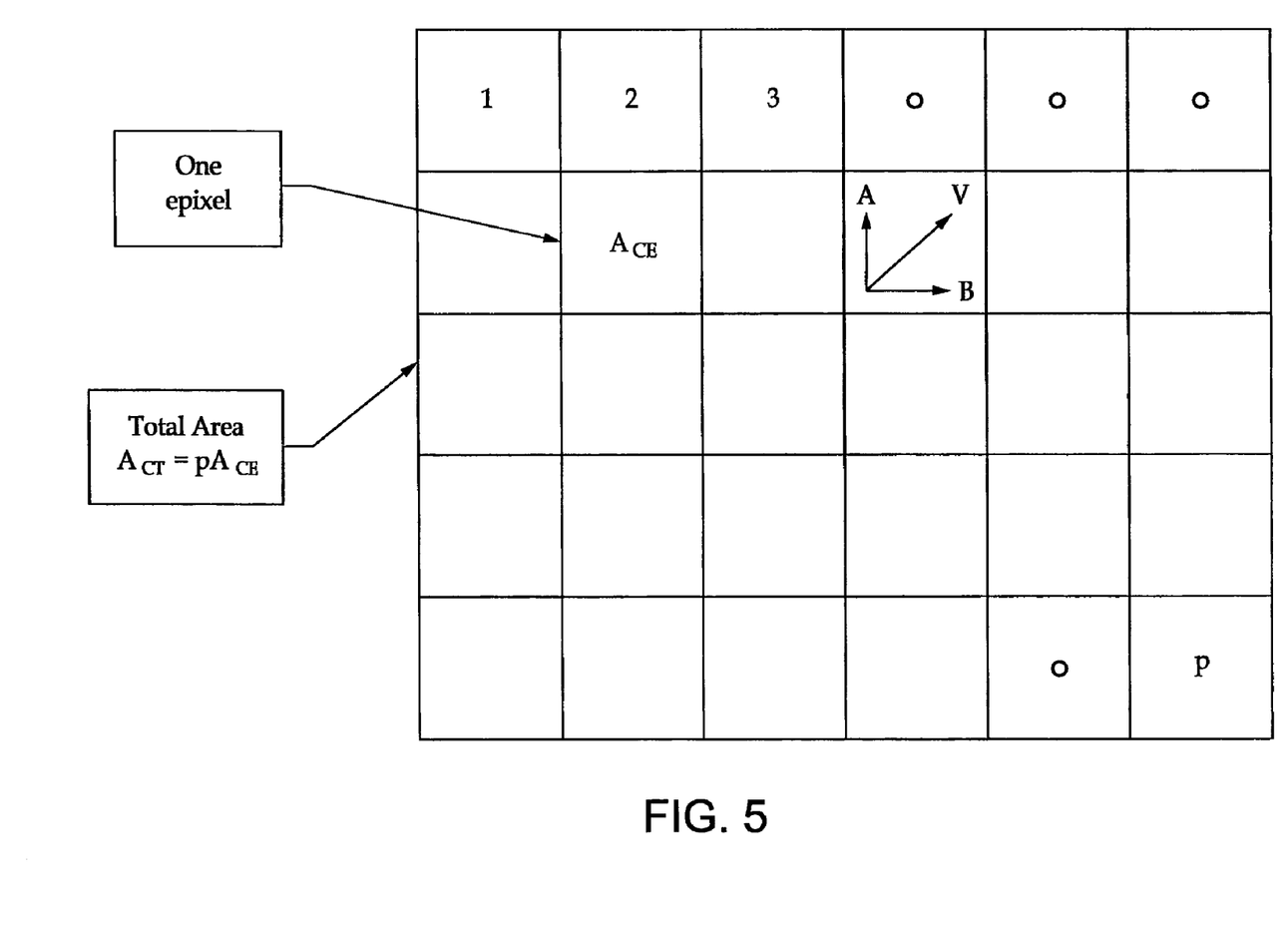
FIG. 5 depicts a capture area segmenter of $A_{CT}=PA_{CE}$.

FIG. 5 depicts the geometry of a capture area signal segmenter. The total area $A_{CT}$ is segmented into p-equal area epixel capture areas, $A_{CE}$. For the purpose of illustration, the epixels are numbered. However, in practice, each epixel is treated the same as every other epixel. It follows that $A_{CT}=PA_{CE}$. Geometrically, each epixel is a square which effectively resolves the polarization vector "V" of an incident signal into two vector components "A, B" that align with the dimensions of the square. Two scalar energy paths associated with each epixel carry the energy of the two polarization vector components into the signal processing system.

Equation (17) details that the total rectangular area, $A_{CaptureTotal}$ or $A_{CT}$ is segmented into p equal-area epixel capture areas $A_{Capture\ Epixel}$ or $A_{CE}$—See Equation (18).

$$A_{Capture\ Total} = \frac{kT_0 B_{Detection} F_{System}}{W_{MinDetSignal}} \quad (17)$$

$$A_{CaptureEpixel} = \left(\frac{3}{2}\right) 2^{2N} \frac{kT_0 F_{Nyquist} \cdot (F_{System} - 1)}{W_{MaximumInterferer}} \quad (18)$$

$A_{CT}$ represents a fundamental limit for the smallest total capture area such that the smallest signal in the environment will result in a signal strength equal to or greater than the system noise floor. $A_{CE}$ also represents a fundamental limit for the largest area of an epixel such the largest signal in the environment will result in a signal strength that is less than or equal to the ADC full scale amplitude. The terms on the right side of the two equations are independent variables.

The physical constants are the Boltzmann constant "k" and standard temperature "$T_0$". The independent variables defined by the ADC are the number of bits, "N", and the Nyquist frequency, "$f_{Nyquist}$" which is determined by the ADC sample rate. The detection bandwidth, $B_{Detection}$ and the system noise figure, "$f_{system}$" de fine the system noise floor and hence the system MDS, which is equal in power to the system noise floor in the detection bandwidth. The remaining two variables relate to the mission requirements: "$W_{MinDetSignal}=W_{MDS}$" is the minimum detectable signal power density in Watts per square incident on the air interface defined by $_{ACT}$; "$W_{MaximumInterferer}=W_{XIS}$" is the signal power density in Watts per square of the largest interfering signal incident on the air interface defined by $A_{CE}$. The units of area for the Epixels, $A_{CE}$ and the Eplane $A_{CT}$ will be the same as the units of area used to specify $W_{XIS}$ and $W_{MD}$ Equation (19) defines the fundamental limit for p which is the ratio of the rectangular area $A_{CaptureTotal}$ or $A_{CT}$ to the area of one of the epixels, $A_{CaptureEpixel}$ or $A_{CE}$.

$$p_{Fundamental\ Limit} = \left(\frac{2}{3}\right) 2^{-2N} \frac{B_{DET}}{f_{NYQ}} \frac{F_{SYS}}{(F_{SYS}-1)} \frac{W_{XIS}}{W_{MDS}} \quad (19)$$

$A_{CT}$, as expressed in the Equation (17), is a fundamental limit defining the minimum capture area that is necessary to support the system minimum-detectable signal requirement. $A_{CE}$ is a fundamental limit defining the maximum capture area that will ensure that the largest signal in the environment will not exceed the full-scale rating of the ADCs in the signal paths. It follows that the ratio of $A_{CT}$ to $A_{CE}$ defines a fundamental limit on the value of p such that no other configuration can meet these two requirements with fewer ADCs.

A design example is provided below for the p-channel use and is based on the theory of fundamental limits presented in the present application. The starting point for the design is a specified number of large and small signals in an environment that are to be simultaneously processed by the software-defined signal acquisition system. Within the wireless community, this is often termed as the "NEAR-FAR problem" and refers to a situation wherein a plurality of identical wireless devices is located within the field of view of a base station. In this situation, the NEAR device generates the largest signal while the FAR device generates the smallest signal. These terms are used to define the design example.

Design parameters (independent variables)
Signal:
Signal frequency of operation: 2 GHz
Signal bandwidth: 30 kHz
System noise figure: 7 dB
Signal power detected using a test antenna:
NEAR signal: $1.51 \times 10^{-4}$ Watts
FAR signal: $7.81 \times 10^{-17}$ Watts
ADC Properties (ideal)
Full-scale power: $1 \times 10^{-3}$ Watts
Sample rate: 180 Mega-samples/Second
Number of bits: 12
Design Results (Dependent Variables)
System
Signal dynamic range: >123 dB Equation (13)
Preamplifier (noiseless):
Available gain: >27.57 ratio Equation (5)
Output third-order intercept:
>21.72 Watts Equation (10)
Air Interface Capture Areas
(based on the capture area of the test antenna)

Test Antenna Capture Area=$(3\lambda^2/8\Pi)$

Epixel: $<6.45 \times 10^{-4}$ meter$^2$ Equation (14)
Eplane: $>2.06 \times 10^{-2}$ meter$^2$ Equation (17)
p: 32 ratio Equation (16)

It will be understood that many additional changes in the details, materials, steps and arrangement of parts, which have been herein described and illustrated in order to explain the nature of the invention, may be made by those skilled in the art within the principle and scope of the invention as expressed in the amended claims.

What is claimed is:

1. A method for designing a broadband signal intercept system, said method comprising the steps of:
   providing an analog signal;
   choosing a signal bandwidth of a Nyquist zone in which the signal bandwidth is less than one half of a digital sampling frequency;
   quantizing a voltage amplitude of a sample of the analog signal;
   converting the analog signal to a digital sampled signal to associate a time with each digital sample;
   establishing a signal dynamic range from a minimum detectable signal to a largest signal wherein the minimum detectable signal is capable of capture in the presence of the largest signal and wherein the frequency separation of the minimum detectable signal and the largest signal is greater than the combined bandwidths of the two signals and wherein the largest signal can be specified in terms of power density at an air interface and wherein the minimum detectable signal can be specified in terms of power density at the same air interface such that the signal dynamic-range requirement can be defined in terms of the signal power densities at the air interface;
   segmenting the air interface as an Eplane into a plurality of equal-area Epixels, such that each Epixel has at least two associated signal channels wherein two of the signal channels correspond to two orthogonal components of a polarization vector associated with incident electromagnetic signal energy at each Epixel such that a capture area of the Eplane is the sum total of a capture area of the plurality of the Epixels wherein the capture area of each Epixel is chosen such that an incident electromagnetic signal with a largest signal power density will not overload an analog-to-digital converter associated with the signals paths associated with that Epixel and wherein the total number of Epixels and the capture area of the Eplane is such that an electromagnetic signal at the Eplane with a minimum detectable signal power density will result in a minimum detectable signal when all of the digital samples from all of the Epixels that are active are combined from the digital outputs of a plurality of digitized Epixel electromagnetic signals;
   sampling the signal voltage associated with each Epixel signal path during said analog-to-digital conversion step;
   converting each signal voltage sample into an N-bit digital word representing a voltage quantization interval in which the signal voltage sample falls at the time of said sampling step; and
   combining the digital samples to evidence energy associated with each electromagnetic signal incident on the air interface within the signal processing bandwidth such that energy of the largest signal and energy of the smallest signal are separated.

2. A method for designing a frequency range at an air interface metasurface, said method comprising the steps of:
   providing a signal frequency and a bandwidth;
   measuring noise of a detection system at the signal frequency;

determining a largest signal and a minimum detectable signal by measuring signal power detectable with an antenna having a known capture area at the signal frequency and within the signal bandwidth;

establishing analog-to-digital converter properties of full scale power, a sample rate and a quantization interval;

determining the dynamic range of the air interface by the equation of dividing the power of the largest signal by the power of the minimum detectable signal;

calculating available gain of a pre-amplifier based on available power and noise associated with the circuit for the pre-amplifier wherein the pre-amplifier is operationally connected to the air interface and operationally connected to an analog-to-digital converter;

determining a linearity constraint for the pre-amplifier based on computing a minimum value for the output third-order intercept of the pre-amplifier;

calculating a signal capture area for one epixel of the interface such that a maximum interfering signal does not exceed a full-scale signal power of the analog-to-digital converter; and establishing a total capture area of all epixels of the interface wherein the captured minimum detectable is at least equal to a system noise power in the signal bandwidth.

3. The method in accordance with claim 2 wherein said method allows design of a wide band signals intercept system such that when an instantaneous bandwidth approaches a Nyquist bandwidth of an analog-to-digital converter and further permitting the use of fixed-frequency analog-to-digital clocks and local oscillator signals which can be designed and filtered to reduce phase noise and spurious frequency components that interfere with the detection of small signals by reciprocal mixing wherein the reciprocal mixing occurs in frequency translators and analog-to-digital converters in each signal path.

4. A system for optimizing a broadband signal dynamic range at an air interface of a signals intercept system, said system comprising:

a signal segmenter capable of segmenting an analog signal entering a signal port of said signal segmenter into equal amplitude signals segments;

a plurality of signal paths operationally connected and positioned subsequent to said signal segmenter;

a plurality of frequency-selective pre-amplifiers with each of said pre-amplifiers within each of said signal paths wherein each of said pre-amplifiers is capable of receiving the analog signal and is capable of limiting signal bandwidth to less than one Nyquist bandwidth;

a plurality of analog-to-digital converters with each of said converters positioned within each of said signal paths subsequent to each of said pre-amplifiers; and a digital signal combiner wherein the total power contained in the signal segments is convertible to a digital image such that said signal combiner is capable of computing a weighted digital sum of said channels and presenting a result as a digital data stream at a combiner output port thereby establishing optimum parameters at the air interface;

wherein said signal combiner is controllable to accomplish beam-forming, polarization tracking, multipath abatement and scintillation abatement;

wherein said analog-to-digital converter is characterized by a sampling rate with the number of bits in each sample and the quantization of each input voltage;

wherein said pre-amplifier further comprises a frequency translator capable of translating a desired signal band into one of the Nyquist zones of said analog-to-digital converter.

\* \* \* \* \*